United States Patent
Kruckemeyer et al.

(10) Patent No.: US 6,318,519 B1
(45) Date of Patent: Nov. 20, 2001

(54) MAGNETORHEOLOGICAL FLUID DAMPER TUNABLE FOR SMOOTH TRANSITIONS

(75) Inventors: William Charles Kruckemeyer, Beavercreek; Eric Lee Jensen; Richard Edward Longhouse, both of Dayton; Patrick Neil Hopkins, West Carollton, all of OH (US); John David Fehring, Churubusco, IN (US); Ilya Lisenker, Miamisburg; James A. Morgan, Springboro, both of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/654,607

(22) Filed: Sep. 1, 2000

Related U.S. Application Data

(60) Provisional application No. 60/153,505, filed on Sep. 13, 1999.

(51) Int. Cl.[7] ....................................... F16F 9/53
(52) U.S. Cl. .................. 188/267; 188/322.22; 188/267.2
(58) Field of Search ................ 188/267, 267.1, 188/319.1, 322.22; 267/140.146, 140.15

(56) References Cited

U.S. PATENT DOCUMENTS

| | | | |
|---|---|---|---|
| 5,284,330 | * 2/1994 | Carlson et al. | 267/140.14 |
| 5,632,361 | * 5/1997 | Wulff et al. | 188/267.2 |
| 5,878,851 | * 3/1999 | Carlson et al. | 188/267.2 |
| 5,947,238 | * 9/1999 | Jolly et al. | 188/267.1 |
| 6,095,486 | * 8/2000 | Ivers et al. | 188/267.2 |
| 6,131,709 | * 10/2000 | Jolly et al. | 188/267.2 |

\* cited by examiner

Primary Examiner—Christopher P. Schwartz
(74) Attorney, Agent, or Firm—Robert M. Sigler

(57) ABSTRACT

An improved magnetorheological fluid damper is provided which effectively provides a smooth transition, without a sharp break in the damper force/velocity curve, between very low damping forces near zero damper velocity to higher damping forces at higher piston velocities while maintaining desirable maximum force levels. The damper includes a piston assembly, including a magnet assembly and a flow gap extending through the piston assembly to permit fluid flow between the chambers. The force/velocity optimization feature includes a groove or passage open to the flow gap, positioned in series with a part of the flow gap in a magnetic circuit generated by the magnet assembly and dimnensioned/sized to permit fluid flowing through the passage to experience a magnetorheological effect less than a magnetorheological effect experienced by fluid flowing through the flow gap but not through the groove. Preferably, the passage is formed in an inner annular surface of a flux ring positioned around a piston core. The passage may be formed, for example, by a curvilinear surface, a modified rectangular surface or a triangular surface.

15 Claims, 4 Drawing Sheets

MAGNETORHEOLOGICAL FLUID DAMPER TUNABLE FOR SMOOTH TRANSITIONS

RELATED APPLICATION

This application is related to Provisional U.S. Patent Application No. 60/153,505 entitled Magnetorheological Fluid Damper Tunable for Smooth Transitions, filed Sep. 13, 1999 and assigned to the same assignee.

TECHNICAL FIELD

The present invention relates to a magnetorheological fluid damper and more particularly, to a linear acting fluid damper for a vehicle suspension employing magnetic tuning in connection with a magnetorheological working fluid to effect desired damping levels.

BACKGROUND OF THE INVENTION

Magnetorheological fluids that comprise suspensions of magnetic particles such as iron or iron alloys in a fluid medium are well known. The flow characteristics of these fluids can change by several orders of magnitude within milliseconds when subjected to a suitable magnetic field due to suspension of the particles. The ferromagnetic particles remain suspended under the influence of magnetic fields and applied forces. Such magnetorheological fluids have been found to have desirable electro-magnetomechanical interactive properties for advantageous use in a variety of controllable coupling and damping devices, such as brakes, clutches, and dampers.

In particular, linear acting MR dampers are proposed for suspension systems, such as a vehicle suspension system and vehicle engine mounts. PCT patent application 10840, published Jan. 8, 1998 (the '840 application), discloses a conventional linear acting controllable vibration damper apparatus which includes a piston positioned in a magnetorheological fluid-filled chamber to form upper and lower chambers. The piston includes a coil assembly, a core, i.e. pole pieces, and an annular ring element positioned around the pole pieces to form an annular flow passage for permitting flow of the magnetorheological fluid between the chambers. When the piston is displaced, magnetorheological fluid is forced through the annular flow passage. When the coil is energized, a magnetic field permeates the channel and excites a transformation of the magnetorheological fluid to a state that exhibits increased damping forces.

The damping performance of a suspension damper is largely dependent on the force-velocity characteristics of the damper. In standard suspension dampers of the prior art that do not use MR fluid, the force-velocity curve typically has a steeper slope at low velocities and desirably passes through the zero point of damping force at zero velocity, thus producing a smooth transition between damper movements in the compression and extension directions. Without special design considerations, however, a suspension damper using MR fluid tends to have a force-velocity curve that intersects the force axis at a value above zero from the positive velocity side, as seen in curve 50 of FIG. 4, and a value below zero from the negative velocity side, thus producing a jump in force between finite positive and negative values with each change in the direction of damper movement. These jumps in force tend to provide a harshness to the vehicle ride which may be felt by the vehicle occupants.

Prior art teachings of MR dampers in patents and other publications, to the extent they discuss it, attempt to solve the zero intersect problem by including one or more fluid bypass passages through the piston or on the outer surface thereof, in an area of weak or no magnetic flux and not open to the main, magnetic flux controlled fluid path through the piston: for example in the outer surface of the flux ring. The relatively unimpeded flow of MR fluid through the outer bypass passages permits the damping curves to intersect zero. However, this design also results in an undesirably steep rise in the damping curve from the zero point followed by a sharp transition into higher velocities. In addition, the steep rise may often result in the damper overshooting the desired force at the transition. The steep slope and overshooting, as seen in curve 52 of FIG. 4, results in discontinuities which are generally undesirable in vehicle suspensions. Specifically, the use of a totally separate bypass passage impairs the ability to achieve noise control and smooth load transfer. Also, the MR fluid flowing through the outer bypass passages is not within the magnetic flux path or circuit, is not exposed to magnetic flux and therefore does not experience an MR effect. As a result, the outer passages represent a pure loss in pressure in the system which disadvantageously reduces the maximum force achievable.

Therefore, there is a need for an MR damper capable of effectively providing a smooth and controllable transition, without a sharp break in the damper force/velocity curve, between very low damping forces near zero damper velocity to higher damping forces at higher piston velocities while maintaining desirable maximum force levels.

SUMMARY OF THE INVENTION

The present invention is aimed at providing an MR damper capable of effectively providing a smooth transition between very low damping forces near zero damper velocity to higher damping forces at higher piston velocities without sacrificing maximum force levels.

This and other objects of the present invention are achieved by providing a damper, comprising a cylinder containing magnetorheological fluid and a piston assembly slidably mounted for reciprocal movement in the cylinder to form a first chamber positioned on one side of the piston assembly and a second chamber positioned on an opposite side of the piston assembly. The piston assembly includes a flow gap extending through the piston assembly to permit fluid flow between the first and the second chambers. The piston assembly further includes a magnet assembly adapted to generate a magnetic field extending through the flow gap to cause magnetorheological fluid flowing through the gap to experience a magnetorheological effect affecting the flow of magnetorheological fluid through the gap. The piston assembly further includes a passage positioned to permit fluid to flow through the passage between the first and the second chambers. The passage is positioned within the magnetic field and sized and shaped to permit fluid flowing through the passage to experience a reduced magnetorheological effect less than a magnetorheological effect compared to the MR effect experienced by fluid flowing through the gap.

The magnet assembly may include a core having an outer surface and a flux ring positioned around the core. The flux ring includes an inner surface which at least partially forms the flow gap. At least one of the outer surface of the core and the inner surface of the flux ring includes the passage, i.e. a groove, extending longitudinally along the piston assembly. The groove is open to the main portion of the flow gap. Preferably, the flux ring and flow gap are annular and the groove extends axially along the piston. Preferably, the groove extends from a first end to a second end of the flux ring to permit fluid to flow through the groove between the first and second chambers.

The passage or groove forms a force/velocity optimization feature for effectively smoothing the transition between very low damping forces near zero damper velocity to higher damping forces at higher piston velocities without sacrificing maximum force levels. The groove may be formed in a variety of cross-sectional shapes, including curvilinear, triangular and modified rectangular. In addition, the groove may be formed so as to extend linearly and axially along the piston assembly.

DESCRIPTION OF THE PREFERRED EMBODIMENT

Figure 1:
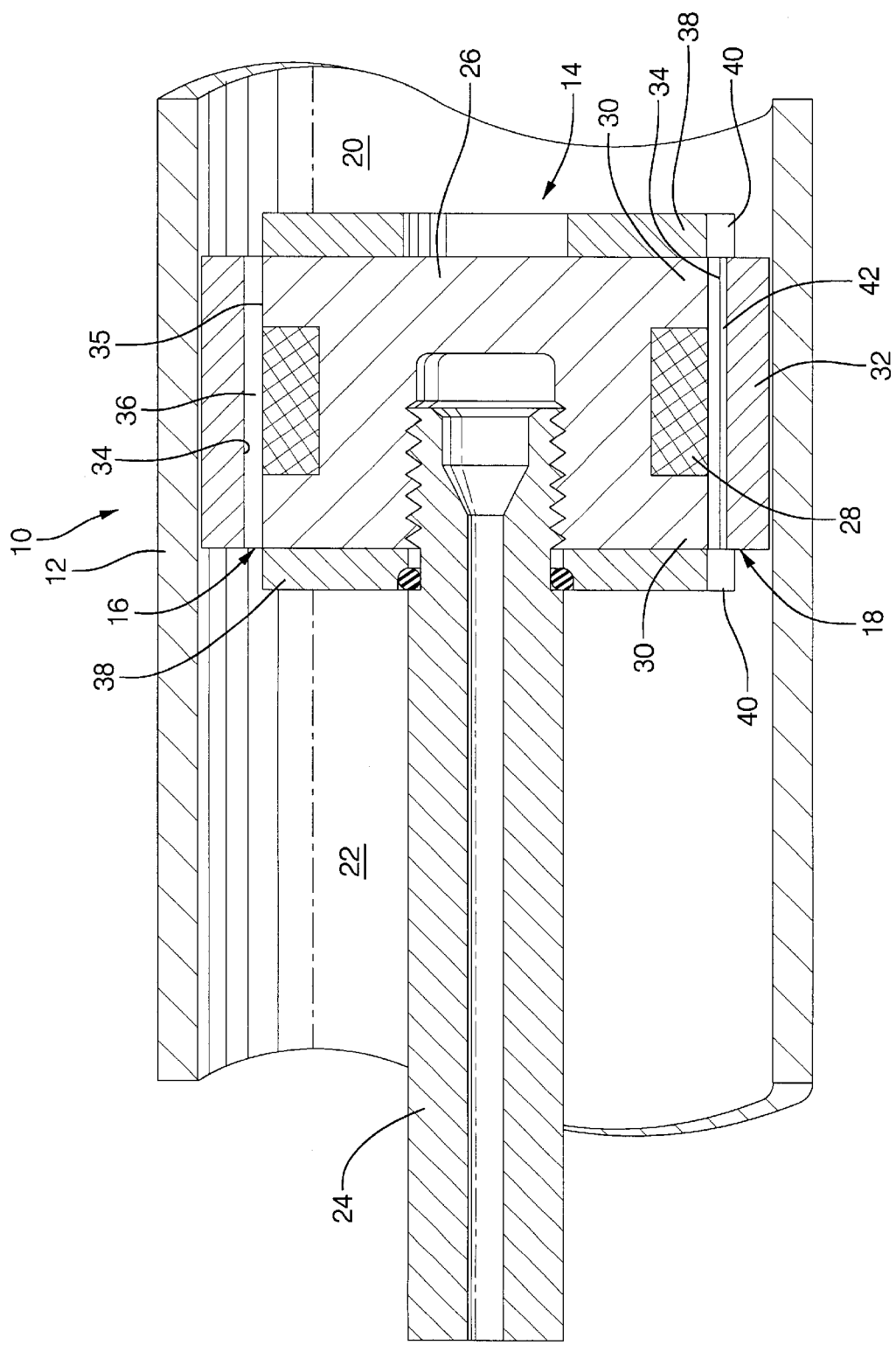
FIG. 1 is a sectional view of a portion of a magnetorheological damper in accordance with the present invention.

Referring to FIG. 1, there is shown a magnetorheological fluid damper of the present invention, indicated generally at 10, designed to provide a smooth transition, without a sharp break in the damper force/velocity curve, between very low damping forces near zero damper piston velocity to higher damping forces at higher piston velocities. Damper 10 includes a cylinder 12 containing magnetorheological fluid, a piston assembly 14 mounted for reciprocal movement in cylinder 12, a magnet assembly 16 mounted on piston assembly 14 to generate a magnetic field, and a force/velocity curve optimization feature indicated generally at 18. Force/velocity curve optimization feature 18 effectively creates a continuous, smooth transition between low and high velocity damping forces while permitting dampers to be selectively tuned in a predetermined manner to achieve desired damping effects for a given application.

Piston assembly 14 divides cylinder 12 into a first chamber 20 positioned on one side of piston assembly 14 and a second chamber 22 positioned within the cylinder 12 on an opposite side of piston assembly 14. Piston assembly 14 includes a cylindrical rod 24 and a piston core 26 mounted on one end of rod 24 and formed of a magnetic material. Magnet assembly 16 includes a coil 28 mounted on piston core 26, which may be spool shaped to form flux pole pieces 30 positioned on each axial side of coil 28. Coil 28 is connected to an electrical source (not shown) via leads extending through rod 24 for generating an electrical current in the coil. Magnet assembly 16 also includes an annular flux ring 32 containing a central bore for receiving piston assembly 14. As shown in FIG. 1, flux ring 32 is positioned around piston assembly 14 to form an annular flow gap 36 between an inner annular surface 34 of flux ring 32 and an outer surface 35 of piston core 26.

Damper 10 further includes non-magnetic end plates 38 positioned on each axial end of piston core 26 for securing flux ring 32 to piston core 26. Flux ring 32 must be effectively secured against movement relative to piston core 26 so as to precisely form and maintain a desired radial width or thickness of flow gap 36 thereby providing predictable control of the damping effect. Each end plate 38 includes several radial extensions 40 angularly spaced around the circumference of end plate 38 for connection to flux ring 32. The outer diameter of end plates 38 is no greater than the outer diameter of piston core 26, except for the flow areas covered by radial extensions 40, to permit substantially unimpeded flow of magnetorheological fluid through flow gap 36. End plates 38 may be connected to piston core 26 and flux ring 32 by any conventional means, such as threaded fasteners or welding.

Fundamentally, during damping, magnetorheological fluid present in one of the chambers of cylinder 12 flows through flow gap 36 from, for example, first chamber 20 to second chamber 22 as piston assembly 14 moves to the right as shown in FIG. 1. Flux ring 32 is designed with an outer diameter sized to form a sliding fluid seal with the inner surface of cylinder 12 so as to permit relative sliding movement while avoiding significant leakage at the interface. The magnetorheological fluid may be any conventional fluid including magnetic particles such as iron or iron alloys suspended therein, so as to be controllably varied with respect to its shear flow characteristics by a magnetic field applied across flow gap 36 and thus vary the flow characteristics of the fluid through flow gap 36. The magnetic field is generated by current in coil 28 and is applied to flow gap 36 by a magnetic circuit comprising flux pole pieces 30 of piston core 26 and flux ring 32, in which magnetic flux circuit flow gap 36 is the predominant gap. The electrical current to coil 28 is varied to vary the magnetic field thereby controlling the flow characteristics of the magnetorheological fluid to achieve a desired damping effect for a given application.

Figure 2:
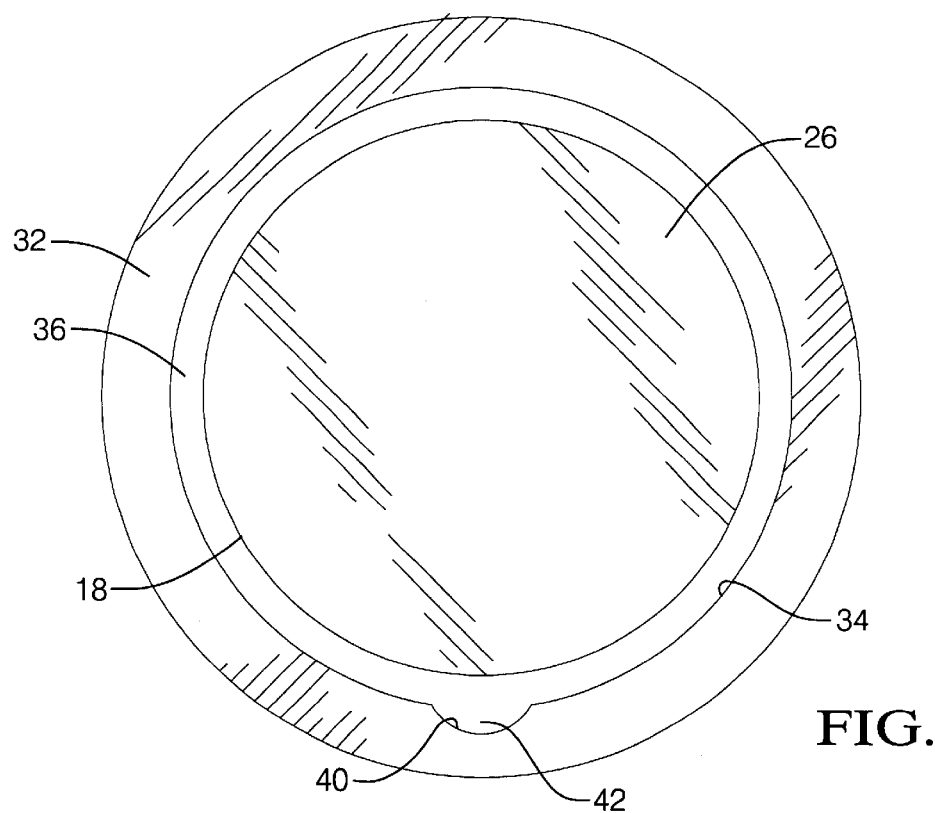
FIG. 2 is a simplified end view of the piston of the damper of FIG. 1 showing the annular flow gap having a groove in the inner surface thereof.
Figure 3:
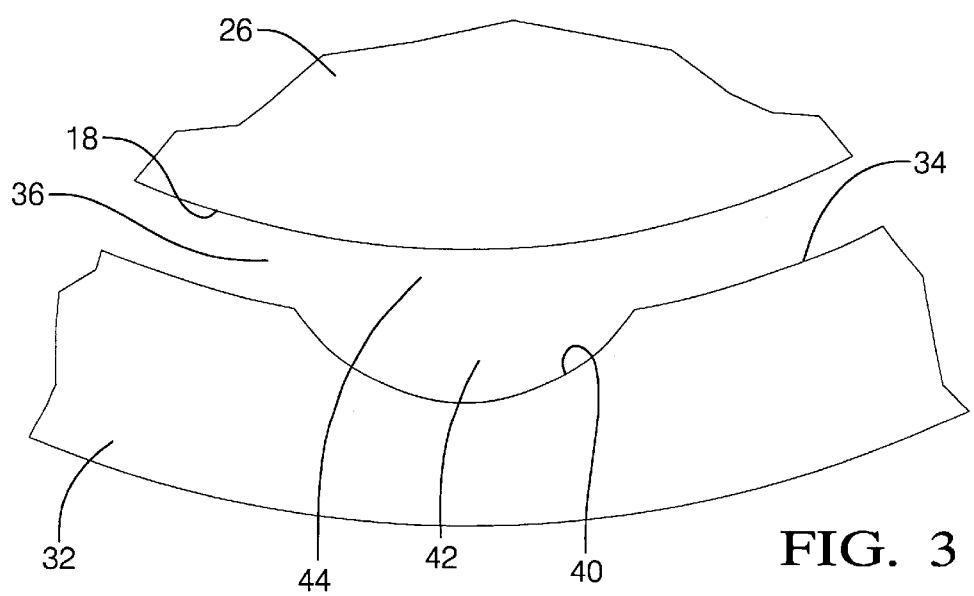
FIG. 3 is an enlarged view of a portion of the view of FIG. 2.

In accordance with this invention, force/velocity optimization feature 18 includes an axial passage or groove 42 formed in inner annular surface 34 of flux ring 32 as shown in FIGS. 1–3. Groove 42 extends along the entire axial length of annular flow gap 36 to permit fluid flow through the groove between first chamber 20 and second chamber 22. Groove 42 is formed, in the embodiment of FIGS. 1–3, by a concave, curvilinear arc 40 formed in the inner radial surface 40 of flux ring 32, which arc creates a larger radial gap width in a small circumferential region 44 of gap 36 and a narrowing of the radial width of the flux ring 32 at the deepest point of the groove. Both the greater gap width and the narrower magnetic flux path through the narrowed flux ring tend to reduce flux density in region 44 as compared with the remainder of the gap at any given coil current level. This decrease in flux is not uniform across the gap. A flux gradient in region 44 provides flux levels decreasing from its inner border at the outer surface 35 of flux pole pieces 30 to a lower value along the surface of the groove 42. With careful design, if desired, this decrease may be close to zero flux at the surface of groove 42. In addition, this gradient is generally not linear. Most of the decrease in flux occurs within the groove 42, with flux levels not decreasing greatly within the main gap 36 itself. But the gradient provides a smooth transition between flow gap 36 and groove 42.

In operation of the damper, with a given electric current in coil 28 and no damper velocity, coil 28 generates a predetermined flux level in flow gap 36 and a decreasing flux gradient in groove 42. The magnetic particles suspended in the fluid are aligned to provide an elevated yield stress to fluid flow through flow gap 36 and a less elevated yield stress in groove 42. An increase in damper velocity from zero speed produces a pressure drop between chambers 20 and 22 that causes an increased shear stress on the fluid within gap 36 and groove 42. As the shear stress increases, the yield stress of the fluid is first surpassed, and the fluid begins to flow, at the surface 40 of groove 42, where the magnetic flux is lowest. As the pressure difference rises, the shear stress increases to provide flow in a region within groove 42 expanding from the surface 40 toward the main flow gap 36. This increasing volume of the column of flowing fluid allows the velocity of the damper to increase, somewhat slowing and smoothing the pressure rise within the damper. When the shear stress nears the yield stress of the flow gap 36 itself, the fluid of region 44 provides a smoothing transition to addition of the fluid in the entire flow gap 36 to the already flowing column of fluid in groove 42. With the great increase in fluid flow volume of the main flow gap 36, the effect of groove 42 is greatly reduced in comparison; and the operation of the damper is essentially controlled by the flux level in flow gap 36. It is important to note that, since the groove 42 is open to the main portion of flow gap 36, there is a yield stress gradient between the groove and the remainder of the flow gap which coordinates and smoothes the entry of the main portion of the flow gap 36 into the fluid flow. Such coordination would be difficult, if not impossible, to obtain with the use of separate bypass passages. The beneficial effects of groove 42 are provided at low piston velocities, which occur at both ends of each piston stroke, as the piston velocity slows to zero and then increases in the opposite direction. But control is not reduced at higher velocities, since the cross-sectional area of the groove is small compared to the flow gap and the purely hydraulic restriction at the higher velocities becomes equal to the MR effect generated restriction.

Accordingly, the magnetorheological fluid in groove 42 is subject to less magnetic field strength and thus provides less magnetorheological effect. At low velocities, this reduced magnetorheological effect in groove 42 has a significant desirable effect of permitting sufficient flow through groove 42 to smooth the transition to higher forces/velocities. However, at higher velocities, the portion of the fluid in groove 42 experiences a hydraulic restriction equal to the magnetorheological effect in flow gap 36, preventing loss of pressure at high damper velocities and thus maintaining maximum force levels. As described above, groove 42 is sized and shaped such that, at low piston velocities, the amount of fluid in groove 42 affected by the decreased magnetorheological effect significantly affects the total damping of damper 10 as shown in curve 54 of FIG. 4 as a substantially Newtonian fluid. Specifically, at low damper velocities, fluid in groove 42 experiences a reduced magnetorheological effect less than fluid flowing through annular flow gap 36 thereby creating a modified bypass which desirably decreases the rate of increase in the damping force during damper velocity increase. As the velocity increases or the flux density increases, the hydraulic restriction or the magnetorheological effect, respectively, experienced by the fluid flowing through groove 42 increases to create a greater restriction and thus less of a bypass through the damper. At high velocities the magnetorheological effect on the fluid in groove 42 does not significantly impact the total magnetorheological effect experienced throughout annular flow gap 36. The shape of groove 42 is designed to control the slope and provide for a smooth transition in the force-velocity curve as the damper piston velocity increases from zero to substantial values as shown in curve 54 of FIG. 4. Although a single groove 42 is shown, multiple grooves may be provided around the inner circumference of flux ring 32 or the outer surface 35 of piston core 26. Thus, likewise, multiple grooves may be provided in outer annular surface 35.

Figure 5:
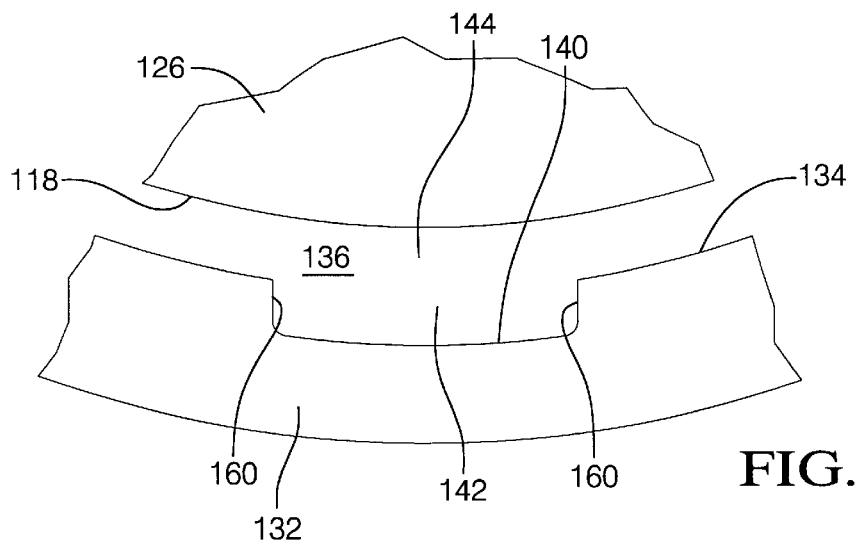
FIGS. 5–7 are views similar to FIG. 2 showing alternative embodiments of the invention.
Figure 6:
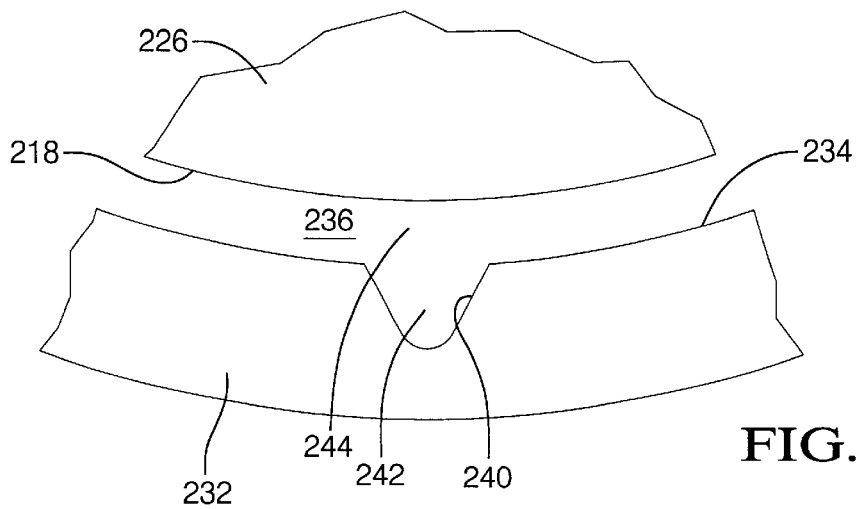
Figure 7:
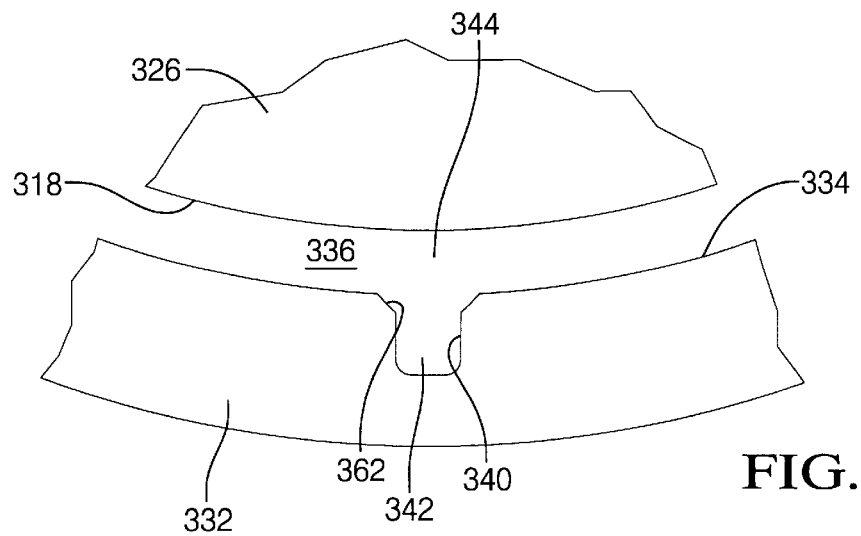

Variations in the shape of groove 42 are seen in FIGS. 5–7. Each of these variations produces an increase in radial gap width as well as an increase in surface area of flux ring 32 adjacent the flow gap. Corresponding reference numerals in different hundreds are used in these figures. FIG. 5 shows modified rectangular groove 142, with short, sharply dropped sides 160 and a wide curved or straight bottom 140. FIG. 6 shows a triangular groove 242, with angled sides 240. FIG. 7 shows a deeper rectangular groove, with deeper sides and shorter bottom than that shown in FIG. 5 and with chamfers 362 joining the sides to the inner radial surface 334 of flux ring 332. Each of these shapes provides the basic benefits of this invention but with a somewhat different specific magnetic flux gradient. Other specific shapes provide obvious variations which are included in the scope of the invention.

Figure 4:
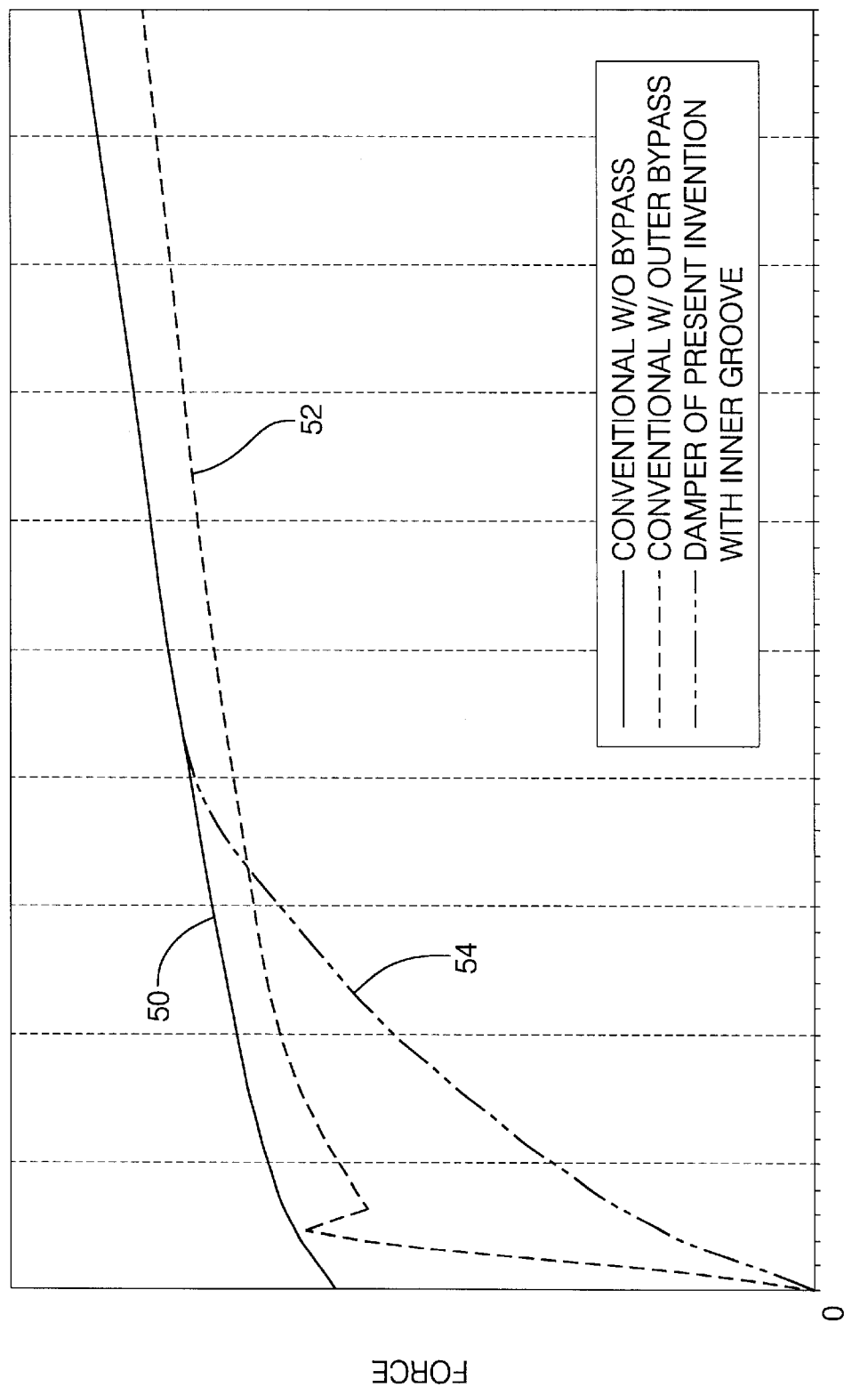
FIG. 4 is a graph comparing the force/velocity curves for conventional dampers and the damper of the present invention.

Force-velocity optimization feature 18, including groove 42, of the present invention, advantageously permits an MR damper assembly to be selectively designed to produce the precise force/velocity characteristics desired for a particular application. Specifically, the dimensions and shape of groove 40, and perhaps the number of grooves provided, can be selected to achieve the slope of the force/velocity curve desired. This tunable feature is particularly advantageous in vehicle suspensions used for vehicles operating under different conditions. Thus, the damper designer is provided with a full range of options regarding the desired output damping curve and its characteristics thereby permitting a unique damping profile to be designed for each specific application. Referring to FIG. 4, in addition, the damper of the present invention effectively avoids the undesirable step load characteristics at the zero crossing point of conventional dampers having no bypass arrangement (curve 50 near zero velocity). In addition, the damper of the present invention avoids the steep rise in the force/velocity curve at low velocities, the sharp transition into the remainder of the damping curve and the discontinuities, such as the force overshoot shown in curve 52 of FIG.4, generated by conventional dampers with simple outer bypass slots or passages formed in the damper assembly outside the magnetic field or flux path. Discontinuities are generally disruptive and undesirable in vehicle suspensions due to noise, load transfer and comfort issues. The damper of the present invention allows for the elimination of the discontinuous nature of previous damper designs and permits the force/velocity curve of an MR damper to be tailored to achieve a continuous curve slope transition from low to high velocities. Moreover, conventional dampers having an outer bypass outside the magnetic field, e.g. formed in the outer surface of the flux ring, permit flow through the piston assembly throughout all operating conditions thereby resulting in a pure pressure loss in the system throughout all operating conditions thus disadvantageously lowering the maximum force achievable as shown in FIG. 4. The damper of the present invention, however, effectively creates a smooth transition between low and high velocities while maintaining a high force level.

The groove provided in this invention does not need to be axial, or even straight. If the flow gap is provided in a different orientation, the groove will naturally follow the flow gap and assume the same or a similar orientation. For example, the passage through the piston assembly may comprise portions that are essentially axial with a portion which is radial or circumferential that includes the flow gap in which magnetic control is provided. Since the groove must be open to the flow gap in the direction of fluid flow, the groove will also be radial or circumferential as required.

In addition, the groove does not necessarily need to extend completely through the piston or the magnetically controlled flow gap. Even a short length of groove will provide some of the beneficial effect of the invention; and in some cases this may be sufficient. As an example, if such a groove were to be used on the inside of annular flow gap 36 in the embodiment of FIG. 1, it could be formed axially in the surface 35 of piston core 26 on each axial side of coil 28. Since the inner surface of coil 28 is flush with that of surface 35, the groove could not easily be continued across coil 28 without redesign of the coil; and fluid flowing through the groove would thus have to leave the groove and enter the main flow gap 36 as it passed the coil. But the beneficial effect of the invention would be realized to a great degree, particularly since very little magnetic flux crosses the flow gap 36 adjacent the coil and the magnetorheological effect is thus weak in the fluid adjacent the coil and strongest in the fluid adjacent the pole pieces 30, where flow gap 36 would be open to the grooves.

What is claimed is:

1. A damper, comprising:

a cylinder containing a magnetorheological fluid;

a piston assembly slidably mounted for reciprocal movement in the cylinder to form a first chamber positioned on one side of the piston assembly and a second chamber positioned on an opposite side of the piston assembly, the piston assembly having a fluid flow passage therethrough defining a flow gap permitting limited fluid flow between the first chamber and the second chamber and a groove adjacent and open to the flow gap along at least a portion of the flow gap in the direction of fluid flow for parallel fluid flow in the same direction through both the portion of the flow gap and the groove, the piston assembly further including a magnet assembly establishing a magnetic flux circuit through the flow gap and through the groove in series with a region of the flow gap adjacent the groove, the magnetic flux being established through the flow gap and groove transversely to the direction of fluid flow therethrough to cause magnetorheological fluid flowing through the flow gap and the groove to experience a magnetorheological effect affecting the flow of the magnetorheological fluid therethrough, whereby the groove causes the magnetic flux density therethrough to be smoothly reduced from that in the remainder of the flow gap.

2. A damper, comprising:

a cylinder containing a magnetorheological fluid;

a piston assembly slidably mounted for reciprocal movement in the cylinder to form a first chamber positioned on one side of the piston assembly and a second chamber positioned on an opposite side of the piston assembly, the piston assembly having a fluid flow passage therethrough defining a flow gap permitting limited fluid flow between the first chamber and the second chamber and a groove adjacent and open to the flow gap along at least a portion of the flow gap in the direction of fluid flow, the piston assembly further including a magnet assembly establishing a magnetic flux circuit through the flow gap and through the groove in series with a region of the flow gap adjacent the groove, the magnetic flux being established through the flow gap and groove transversely to the direction of fluid flow therethrough to cause magnetorheological fluid flowing through the flow gap and the groove to experience a magnetorheological effect affecting the flow of the magnetorheological fluid therethrough, whereby the groove causes the magnetic flux density therethrough to be smoothly reduced from that in the remainder of the flow gap, wherein the flow gap comprises an annular, axially directed passage within the piston assembly and the groove is axially directed along one of an inner wall and an outer wall defining the annular, axially directed passage.

3. The damper of claim 2, wherein the magnetic flux circuit comprises magnetic poles defining the flow gap and groove and the flow gap and groove in series provide a greater gap width thereacross between the magnetic poles than the flow gap alone.

4. A damper, comprising:

a cylinder containing a magnetorheological fluid;

a piston assembly slidably mounted for reciprocal movement in the cylinder to form a first chamber positioned on one side of the piston assembly and a second chamber positioned on an opposite side of the piston assembly, the piston assembly having a fluid flow passage therethrough defining a flow gap permitting limited fluid flow between the first chamber and the second chamber and a groove adjacent and open to the flow gap along at least a portion of the flow gap in the direction of fluid flow, the piston assembly further including a magnet assembly establishing a magnetic flux circuit through the flow gap and through the groove in series with a region of the flow gap adjacent the groove, the magnetic flux being established through the flow gap and groove transversely to the direction of fluid flow therethrough to cause magnetorheological fluid flowing through the flow gap and the groove to experience a magnetorheological effect affecting the flow of the magnetorheological fluid therethrough, whereby the groove causes the magnetic flux density therethrough to be smoothly reduced from that in the remainder of the flow gap, wherein the magnetic flux circuit comprises magnetic poles defining the flow gap and groove and the flow gap and groove in series provide a greater gap width thereacross between the magnetic poles than the flow gap alone.

5. The damper of claim 4, wherein the groove is formed by a curvilinear surface.

6. The damper of claim 5, wherein the curvilinear surface is a circular arc.

7. The damper of claim 4 wherein the groove is formed by a modified rectangular surface.

8. The damper of claim 4 wherein the groove is formed by a triangular surface.

9. A damper, comprising:

a cylinder containing a magnetorheological fluid;

a piston assembly slidably mounted for reciprocal movement in the cylinder to form a first chamber positioned on one side of the piston assembly and a second chamber positioned on an opposite side of the piston assembly, the piston assembly including a magnet assembly including an annular flux ring having an inner annular surface at least partially forming an annular flow gap, the inner annular surface including an axial groove extending axially along the piston assembly, the annular flux ring including a first end adjacent the first chamber and a second end adjacent the second chamber, the axial groove extending from the first end to the second end to permit fluid to flow through the axial groove between the first and the second chambers, the magnet assembly adapted to generate a magnetic field extending through the annular flow gap to cause magnetorheological fluid flowing through the annular flow gap to experience a magnetorheological effect affecting the flow of the magnetorheological fluid through the annular flow gap, wherein the axial groove is sized and shaped to permit fluid flowing through the axial groove to experience a reduced magnetorheological effect less than a magnetorheological effect experienced by fluid flowing through the annular flow gap when exposed to low flux densities.

10. The damper of claim 9, wherein the axial groove is formed by a curvilinear surface.

11. The damper of claim 10, wherein the curvilinear surface is a circular arc.

12. The damper of claim 9 wherein the groove is formed by a modified rectangular surface.

13. The damper of claim 9 wherein the groove is formed by a triangular surface.

14. The damper of claim 9, wherein the axial groove extends axially along the piston assembly.

15. A damper, comprising:

a cylinder containing a magnetorheological fluid;

a piston assembly slidably mounted for reciprocal movement in the cylinder to form a first chamber positioned on one side of the piston assembly and a second chamber positioned on an opposite side of the piston assembly, the piston assembly having a fluid flow passage therethrough defining a flow gap permitting limited fluid flow between the first chamber and the second chamber and a groove adjacent and open to the flow gap along the flow gap in the direction of fluid flow, the groove permitting fluid flow therethrough from one axial end of the piston to the opposite axial end of the piston in either axial direction and at all piston speeds, the piston assembly further including a magnet assembly establishing a magnetic flux circuit through the flow gap and through the groove in series with a region of the flow gap adjacent the groove, the magnetic flux being established through the flow gap and groove transversely to the direction of fluid flow therethrough to cause magnetorheological fluid flowing through the flow gap and the groove to experience a magnetorheological effect affecting the flow of the magnetorheological fluid therethrough, whereby the groove causes the magnetic flux density therethrough to be smoothly reduced from that in the remainder of the flow gap.

* * * * *